(12) United States Patent
Hassan et al.

(10) Patent No.: US 10,177,953 B2
(45) Date of Patent: Jan. 8, 2019

(54) OFDM TRANSMISSION AND RECEPTION FOR NON-OFDM SIGNALS

(71) Applicant: MICROSOFT TECHNOLOGY LICENSING, LLC, Redmond, WA (US)

(72) Inventors: Amer A. Hassan, Kirkland, WA (US); Christian Huitema, Clyde Hill, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/683,694

(22) Filed: Aug. 22, 2017

(65) Prior Publication Data

US 2017/0373897 A1 Dec. 28, 2017

Related U.S. Application Data

(63) Continuation of application No. 15/156,676, filed on May 17, 2016, now Pat. No. 9,755,879, which is a (Continued)

(51) Int. Cl.
*H04W 4/00* (2018.01)
*H04L 27/26* (2006.01)
(Continued)

(52) U.S. Cl.
CPC ........ *H04L 27/265* (2013.01); *H04L 27/2601* (2013.01); *H04L 27/2647* (2013.01);
(Continued)

(58) Field of Classification Search
CPC ............... H04L 27/265; H04L 27/2647; H04L 27/2601; H04W 4/008; H04W 84/12; H04B 1/0003
See application file for complete search history.

(56) References Cited

U.S. PATENT DOCUMENTS 3,343,093 A 9/1967 Gerwen
4,210,780 A 7/1980 Hopkins et al.
(Continued)

FOREIGN PATENT DOCUMENTS

CN 1462523 A 12/2003
CN 1468486 1/2004
(Continued)

OTHER PUBLICATIONS

"Office Action Issued in Indian Patent Application No. 6090/CHENP/2009", dated Aug. 23, 2017, 6 Pages.
(Continued)

*Primary Examiner* — Dac Ha
(74) *Attorney, Agent, or Firm* — MarK K. Young; Mayer & Williams PC

(57) ABSTRACT

Methods and apparatuses for Orthogonal Frequency-Division Multiplexing (OFDM) communication of non-OFDM radio signals are disclosed. The non-OFDM radio signals are force-modulated into OFDM signals. In one example, a non-OFDM signal is received and is processed into an OFDM signal to produce a created OFDM signal. An actual OFDM signal is also received and is processed together with the created OFDM signal.

20 Claims, 5 Drawing Sheets

(a) Transmitter

Related U.S. Application Data continuation of application No. 14/256,709, filed on Apr. 18, 2014, now Pat. No. 9,363,120, which is a continuation of application No. 13/153,801, filed on Jun. 6, 2011, now Pat. No. 8,718,211, which is a continuation of application No. 11/899,248, filed on Sep. 5, 2007, now Pat. No. 7,970,085.

(60) Provisional application No. 60/928,114, filed on May 8, 2007.

(51) Int. Cl.
  *H04L 29/06* (2006.01)
  *H04B 1/00* (2006.01)
  *H04W 84/12* (2009.01)

(52) U.S. Cl.
  CPC ............ *H04L 69/18* (2013.01); *H04B 1/0003* (2013.01); *H04L 69/12* (2013.01); *H04W 84/12* (2013.01)

(56) References Cited

U.S. PATENT DOCUMENTS

| | | | |
|---|---|---|---|
| 5,504,775 A | 4/1996 | Chouly et al. | |
| 5,675,572 A | 10/1997 | Hidejima | |
| 5,729,535 A | 3/1998 | Rostoker | |
| 5,781,543 A | 7/1998 | Ault | |
| 5,790,516 A | 8/1998 | Gudmundson et al. | |
| 5,867,478 A | 2/1999 | Baum et al. | |
| 6,041,048 A | 3/2000 | Erickson | |
| 6,175,550 B1 | 1/2001 | Van Nee | |
| 6,229,471 B1 | 5/2001 | Herrmann | |
| 6,295,272 B1 | 9/2001 | Feldman | |
| 6,304,611 B1 | 10/2001 | Miyashita et al. | |
| 6,445,773 B1 | 9/2002 | Liang | |
| 6,456,653 B1 | 9/2002 | Sayeed | |
| 6,553,534 B2 | 4/2003 | Yonge et al. | |
| 6,609,039 B1 | 8/2003 | Schoen | |
| 6,654,431 B1 | 11/2003 | Barton et al. | |
| 6,704,072 B2 | 3/2004 | Whinnett | |
| 6,704,572 B1 | 3/2004 | Whinnett et al. | |
| 6,711,141 B1 | 3/2004 | Rinne | |
| 6,721,267 B2 | 4/2004 | Hiben | |
| 6,726,297 B1 | 4/2004 | Uesugi | |
| 6,728,551 B2 | 4/2004 | Chang | |
| 6,760,300 B1 | 7/2004 | Eberle | |
| 6,763,072 B1 | 7/2004 | Matsui et al. | |
| 6,810,006 B2 | 10/2004 | Michon et al. | |
| 6,870,808 B1 | 3/2005 | Liu et al. | |
| 6,882,851 B2 | 4/2005 | Sugar et al. | |
| 6,904,283 B2 | 6/2005 | Li et al. | |
| 6,934,246 B2 | 8/2005 | Park | |
| 6,934,340 B1 | 8/2005 | Dollard | |
| 6,952,454 B1 | 10/2005 | Jalali et al. | |
| 6,961,388 B2 | 11/2005 | Ling et al. | |
| 6,976,202 B1 | 12/2005 | Rezvani et al. | |
| 6,987,729 B1 | 1/2006 | Gopalakrishnan et al. | |
| 6,990,059 B1 | 1/2006 | Anikhindi | |
| 7,012,883 B2 | 3/2006 | Jalali et al. | |
| 7,020,071 B2 | 3/2006 | Mujtaba | |
| 7,020,073 B2 | 3/2006 | Kadous et al. | |
| 7,020,110 B2 | 3/2006 | Walton | |
| 7,035,201 B2 | 4/2006 | Fu | |
| 7,043,681 B2 | 5/2006 | Kroeger et al. | |
| 7,047,032 B2 | 5/2006 | Yun | |
| 7,043,023 B2 | 6/2006 | Watanabe et al. | |
| 7,072,413 B2 | 7/2006 | Walton et al. | |
| 7,075,967 B2 | 7/2006 | Struhsaker et al. | |
| 7,076,246 B2 | 7/2006 | Chitrapu | |
| 7,126,984 B2 | 10/2006 | Wang | |
| 7,133,471 B2 | 11/2006 | Feher | |
| 7,139,320 B1 | 11/2006 | Singh | |
| 7,151,755 B2 | 12/2006 | Xu | |
| 7,151,925 B2 | 12/2006 | Ting et al. | |
| 7,164,649 B2 | 1/2007 | Walton et al. | |
| 7,206,350 B2 | 4/2007 | Korobkov et al. | |
| 7,206,840 B2 | 4/2007 | Choi et al. | |
| 7,286,603 B2 | 10/2007 | Varshney | |
| 7,317,750 B2 | 1/2008 | Shattil | |
| 7,324,437 B1 | 1/2008 | Czylwik | |
| 7,333,531 B2 | 2/2008 | Alamouti | |
| 7,356,343 B2 | 4/2008 | Feher | |
| 7,356,679 B1 | 4/2008 | Le | |
| 7,391,815 B2 | 6/2008 | Lakkis | |
| 7,414,964 B2 | 8/2008 | Hashem | |
| 7,415,085 B2 | 8/2008 | Fujii | |
| 7,448,034 B2 | 11/2008 | Anderson | |
| 7,450,059 B1 | 11/2008 | Schotten | |
| 7,450,559 B2 | 11/2008 | Schotten et al. | |
| 7,551,641 B2 | 6/2009 | Pirzada et al. | |
| 7,623,599 B2 | 11/2009 | McCoy | |
| 7,627,048 B2 | 12/2009 | Larsson | |
| 7,634,016 B2 | 12/2009 | Hassan | |
| 7,643,583 B1 | 1/2010 | Savoj | |
| 7,643,811 B2 | 1/2010 | Reunamaki | |
| 7,672,221 B2 | 3/2010 | Fuji | |
| 7,672,381 B1 | 3/2010 | Kleider | |
| 7,684,473 B2 | 3/2010 | Walton | |
| 7,800,541 B2 | 9/2010 | Moshfeghi | |
| 7,813,701 B2 | 10/2010 | Strong | |
| 7,855,948 B2 | 12/2010 | Anikhindi | |
| 7,860,047 B2 | 12/2010 | Urushihara | |
| 7,877,110 B2 | 1/2011 | Feher | |
| 7,920,823 B2 | 4/2011 | Hassan | |
| 7,929,623 B2 | 4/2011 | Hassan et al. | |
| 7,933,344 B2 | 4/2011 | Hassan et al. | |
| 7,970,085 B2 | 6/2011 | Hassan | |
| 8,045,935 B2 | 10/2011 | Lakkis | |
| 8,072,957 B2 | 12/2011 | Gross | |
| 8,166,534 B2 | 4/2012 | Yariv et al. | |
| 8,144,793 B2 | 5/2012 | Hassan | |
| 8,189,621 B2 | 5/2012 | Hassan | |
| 8,228,850 B2 | 7/2012 | McBeath | |
| 8,249,001 B2 | 8/2012 | Oota | |
| 8,289,837 B2 * | 10/2012 | Kim ..................... | H04B 1/005 370/208 |
| 8,311,140 B2 | 11/2012 | Feher | |
| 8,320,506 B2 | 11/2012 | Jo | |
| 8,374,130 B2 | 2/2013 | Hassan | |
| 2001/0007552 A1 | 7/2001 | Schiff | |
| 2002/0009158 A1 | 1/2002 | Souissi | |
| 2002/0031189 A1 | 3/2002 | Hiben | |
| 2002/0080902 A1 | 6/2002 | Kim | |
| 2002/0119781 A1 | 8/2002 | Li | |
| 2002/0136190 A1 | 9/2002 | Hata | |
| 2002/0141446 A1 | 10/2002 | Koga | |
| 2002/0157058 A1 | 10/2002 | Ariel | |
| 2002/0188723 A1 | 12/2002 | Choi et al. | |
| 2003/0015423 A1 | 1/2003 | LaGreca | |
| 2003/0026200 A1 | 2/2003 | Fu et al. | |
| 2003/0058786 A1 | 3/2003 | Sato et al. | |
| 2003/0067961 A1 | 4/2003 | Hudson | |
| 2003/0095506 A1 | 5/2003 | Jalali | |
| 2003/0112880 A1 | 6/2003 | Walton | |
| 2003/0123383 A1 | 7/2003 | Korobkov et al. | |
| 2003/0154233 A1 | 8/2003 | Patterson | |
| 2003/0223354 A1 | 12/2003 | Olszewski | |
| 2004/0005010 A1 | 1/2004 | He et al. | |
| 2004/0008618 A1 | 1/2004 | Shirakata et al. | |
| 2004/0027997 A1 | 2/2004 | Terry et al. | |
| 2004/0029575 A1 | 2/2004 | Mehta | |
| 2004/0066773 A1 | 4/2004 | Sun | |
| 2004/0073929 A1 | 4/2004 | Morello | |
| 2004/0081121 A1 | 4/2004 | Xu | |
| 2004/0110510 A1 | 6/2004 | Jeon | |
| 2004/0151108 A1 | 8/2004 | Claret et al. | |
| 2004/0151109 A1 | 8/2004 | Batra et al. | |
| 2004/0252775 A1 | 12/2004 | Park | |
| 2004/0252781 A1 | 12/2004 | Park | |
| 2005/0002325 A1 | 1/2005 | Giannakis et al. | |
| 2005/0013238 A1 | 1/2005 | Hassan | |
| 2005/0013284 A1 | 1/2005 | Proctor | |
| 2005/0025039 A1 | 2/2005 | Hwang et al. | |

(56) References Cited

U.S. PATENT DOCUMENTS

| | | |
|---|---|---|
| 2005/0027789 A1 | 2/2005 | Luo et al. |
| 2005/0047259 A1 | 3/2005 | Ahn |
| 2005/0063345 A1 | 3/2005 | Wu et al. |
| 2005/0078759 A1 | 4/2005 | Zhang |
| 2005/0085249 A1 | 4/2005 | Goldstein |
| 2005/0099937 A1 | 5/2005 | Oh et al. |
| 2005/0111462 A1 | 5/2005 | Walton |
| 2005/0117661 A1 | 6/2005 | Kim |
| 2005/0129136 A1 | 6/2005 | Fujii |
| 2005/0130684 A1 | 6/2005 | Kim et al. |
| 2005/0141649 A1 | 6/2005 | Tanabe |
| 2005/0147076 A1 | 7/2005 | Sadowsky |
| 2005/0152466 A1 | 7/2005 | Maltsev et al. |
| 2005/0157805 A1 | 7/2005 | Walton |
| 2005/0160428 A1 | 7/2005 | Ayachitula |
| 2005/0180313 A1 | 8/2005 | Kim |
| 2005/0157670 A1 | 9/2005 | Tang et al. |
| 2005/0190800 A1 | 9/2005 | Maltsev |
| 2005/0197132 A1 | 9/2005 | Lee et al. |
| 2005/0226341 A1 | 10/2005 | Sun |
| 2005/0228850 A1 | 10/2005 | Zhu |
| 2005/0232208 A1 | 10/2005 | Hansen |
| 2005/0237989 A1 | 10/2005 | Ahn et al. |
| 2005/0245197 A1 | 11/2005 | Kadous |
| 2005/0249127 A1 | 11/2005 | Huo |
| 2005/0254457 A1* | 11/2005 | Jung .................. H04L 1/0003 370/328 |
| 2005/0281317 A1* | 12/2005 | Oh ..................... H04B 1/713 375/132 |
| 2006/0009209 A1 | 1/2006 | Rieser et al. |
| 2006/0013285 A1 | 1/2006 | Kobayashi |
| 2006/0034382 A1 | 2/2006 | Ozluturk et al. |
| 2006/0045001 A1 | 3/2006 | Jalali |
| 2006/0046716 A1 | 3/2006 | Hofstaedter et al. |
| 2006/0056283 A1 | 3/2006 | Anikhindi |
| 2006/0063543 A1 | 3/2006 | Matoba |
| 2006/0067288 A1 | 3/2006 | Shim |
| 2006/0078059 A1 | 4/2006 | Ok et al. |
| 2006/0083157 A1 | 4/2006 | Cheng |
| 2006/0083205 A1 | 4/2006 | Buddhikot |
| 2006/0083210 A1 | 4/2006 | Li et al. |
| 2006/0085497 A1 | 4/2006 | Sehitoglu |
| 2006/0087972 A1 | 4/2006 | Jalali |
| 2006/0094372 A1 | 5/2006 | Ahn |
| 2006/0126493 A1 | 6/2006 | Hashem |
| 2006/0128318 A1 | 6/2006 | Agarossi et al. |
| 2006/0135075 A1 | 6/2006 | Tee et al. |
| 2006/0154691 A1 | 7/2006 | Tang et al. |
| 2006/0159120 A1 | 7/2006 | Kim |
| 2006/0171445 A1 | 8/2006 | Batra et al. |
| 2006/0176973 A1 | 8/2006 | Alamouti |
| 2006/0176976 A1 | 8/2006 | Pedersen |
| 2006/0188003 A1 | 8/2006 | Larsson |
| 2006/0188031 A1 | 8/2006 | Liu |
| 2006/0193295 A1 | 8/2006 | White et al. |
| 2006/0211387 A1 | 9/2006 | Pisek et al. |
| 2006/0211395 A1 | 9/2006 | Waltho |
| 2006/0234752 A1 | 10/2006 | Mese |
| 2006/0250944 A1 | 11/2006 | Hong et al. |
| 2006/0269005 A1 | 11/2006 | Laroia et al. |
| 2006/0274820 A1 | 12/2006 | Walton |
| 2006/0287001 A1 | 12/2006 | Budampati et al. |
| 2007/0002728 A1 | 1/2007 | Fujii |
| 2007/0009056 A1 | 1/2007 | Yeon et al. |
| 2007/0016413 A1 | 1/2007 | Seo et al. |
| 2007/0032220 A1 | 2/2007 | Fehrer |
| 2007/0055501 A1 | 3/2007 | Aytur et al. |
| 2007/0058583 A1 | 3/2007 | Cho |
| 2007/0078924 A1 | 4/2007 | Hassan et al. |
| 2007/0086420 A1 | 4/2007 | Schotten |
| 2007/0087772 A1 | 4/2007 | Yi |
| 2007/0091720 A1 | 4/2007 | Woo |
| 2007/0105576 A1 | 5/2007 | Gupta |
| 2007/0115878 A1 | 5/2007 | Ashish |
| 2007/0116137 A1 | 5/2007 | McCoy |
| 2007/0133387 A1 | 6/2007 | Arslan |
| 2007/0140102 A1 | 6/2007 | Oh |
| 2007/0189162 A1 | 8/2007 | Song |
| 2007/0189205 A1 | 8/2007 | Terry |
| 2007/0201503 A1 | 8/2007 | Nishio |
| 2007/0248173 A1 | 10/2007 | Hassan |
| 2007/0263653 A1 | 11/2007 | Hassan |
| 2008/0002733 A1 | 1/2008 | Sutskover |
| 2008/0014880 A1 | 1/2008 | Hyon |
| 2008/0057869 A1 | 3/2008 | Strong |
| 2008/0070610 A1 | 3/2008 | Nishio |
| 2008/0089279 A1 | 4/2008 | Hu |
| 2008/0095135 A1 | 4/2008 | Cleveland |
| 2008/0112518 A1* | 5/2008 | Wilhelmsson ...... H04L 27/2647 375/348 |
| 2008/0137634 A1 | 6/2008 | Hassan |
| 2008/0165671 A1 | 7/2008 | Larsson |
| 2008/0232340 A1 | 9/2008 | Wan et al. |
| 2008/0232490 A1 | 9/2008 | Gross |
| 2008/0253400 A1 | 10/2008 | Carroll |
| 2008/0279291 A1 | 11/2008 | Hassan |
| 2009/0086706 A1 | 4/2009 | Huang |
| 2009/0109914 A1 | 4/2009 | McBeath |
| 2009/0190535 A1 | 7/2009 | Hassan |
| 2009/0262849 A1 | 10/2009 | Jo |
| 2009/0285174 A1 | 11/2009 | Haga |
| 2010/0040167 A1 | 2/2010 | Aoki |
| 2010/0165956 A1 | 7/2010 | Razzell |
| 2010/0173586 A1 | 7/2010 | McHenry |
| 2010/0208852 A1 | 8/2010 | Feher |
| 2011/0116360 A1 | 5/2011 | Wu et al. |
| 2011/0173485 A1 | 7/2011 | Hassan |
| 2011/0235732 A1 | 9/2011 | Hassan |
| 2011/0310930 A1 | 12/2011 | Gerhardt |
| 2012/0128034 A1 | 5/2012 | Fehrer |
| 2012/0182875 A1 | 7/2012 | Hassan |
| 2012/0201317 A1 | 8/2012 | Hassan |
| 2012/0207233 A1 | 8/2012 | Hassan |
| 2014/0376657 A1 | 12/2014 | Agee |
| 2015/0180921 A1 | 6/2015 | Hassan |
| 2016/0309359 A1 | 10/2016 | Hassan |

FOREIGN PATENT DOCUMENTS

| | | |
|---|---|---|
| CN | 1675940 A | 9/2005 |
| CN | 1723676 | 1/2006 |
| CN | 1874334 | 12/2006 |
| EP | 1 156 598 A2 | 11/2001 |
| EP | 1 199834 A2 | 4/2002 |
| EP | 1 408 710 A1 | 4/2004 |
| EP | 1480400 A1 | 11/2004 |
| EP | 1 560 344 | 8/2005 |
| EP | 1 571 773 A2 | 9/2005 |
| EP | 1578 162 | 9/2005 |
| JP | 08-047036 | 2/1996 |
| JP | 2001-230744 A | 8/2001 |
| JP | 2001-285236 | 6/2004 |
| JP | 2004-158965 A | 6/2004 |
| JP | 2004-172907 A | 6/2004 |
| JP | 2004-274103 A | 9/2004 |
| JP | 2004-350326 A | 12/2004 |
| JP | 2005-086479 A | 3/2005 |
| JP | 2005-167502 | 6/2005 |
| JP | 2005-244997 | 9/2005 |
| JP | 2005-260921 | 9/2005 |
| JP | 2006-157890 A | 6/2006 |
| JP | 2006-287344 | 10/2006 |
| KR | 1020050052 A | 6/2005 |
| NZ | 505658 | 2/2003 |
| RU | 2180159 C2 | 2/2002 |
| RU | 2219665 C2 | 12/2003 |
| RU | 2237977 C2 | 10/2004 |
| RU | 2298878 C2 | 5/2007 |
| TW | 583854 B | 4/2004 |
| TW | 1256789 B | 6/2006 |
| TW | 1257779 B | 7/2006 |
| WO | 96/23371 | 8/1996 |
| WO | 98/14026 A1 | 4/1998 |
| WO | 00/74415 | 12/2000 |

(56) References Cited

FOREIGN PATENT DOCUMENTS

| | | |
|---|---|---|
| WO | 02/32161 | 4/2002 |
| WO | 02/33911 A1 | 4/2002 |
| WO | 02/33925 | 4/2002 |
| WO | 02/49306 | 6/2002 |
| WO | 02/062002 A1 | 8/2002 |
| WO | 02-093839 A2 | 11/2002 |
| WO | 03/088602 | 10/2003 |
| WO | 2004/025870 A1 | 3/2004 |
| WO | 2004/042987 A1 | 5/2004 |
| WO | 2004/075499 A1 | 9/2004 |
| WO | 2005/004500 A2 | 1/2005 |
| WO | 2005/060192 A1 | 6/2005 |
| WO | 2005/066914 | 7/2005 |
| WO | 2005125250 A1 | 12/2005 |
| WO | 2006/004466 | 1/2006 |
| WO | 2006/006602 A1 | 1/2006 |
| WO | 2007/062754 | 6/2007 |
| WO | 2005076557 | 8/2007 |
| WO | 2007/108077 | 9/2007 |

OTHER PUBLICATIONS

"Non-Final Office Action Issued in U.S. Appl. No. 11/899,248", dated Oct. 27, 2010, 8 Pages.
"Notice of Allowance Issued in U.S. Appl. No. 11/899,248", dated Feb. 22, 2011, 7 Pages.
"Non-Final Office Action Issued in U.S. Appl. No. 13/153,801", dated Aug. 23, 2012, 6 Pages.
"Non-Final Office Action Issued in U.S. Appl. No. 13/153,801", dated Jun. 6, 2013, 4 Pages.
"Notice of Allowance Issued in U.S. Appl. No. 13/153,801", dated Jan. 18, 2013, 5 Pages.
"Notice of Allowance Issued in U.S. Appl. No. 13/153,801", dated Apr. 23, 2013, 6 Pages.
"Notice of Allowance Issued in U.S. Appl. No. 13/153,801", dated Sep. 30, 2013, 6 Pages.
"Notice of Allowance Issued in U.S. Appl. No. 13/153,801", dated Dec. 18, 2013, 6 Pages.
"Notice of Allowance Issued in U.S. Appl. No. 13/153,801", dated Mar. 6, 2014, 2 Pages.
"Final Office Action Issued in U.S. Appl. No. 14/256,709", dated Jun. 23, 2015, 10 Pages.
"Non-Final Office Action Issued in U.S. Appl. No. 14/256,709", dated Sep. 3, 2015, 12 Pages.
"Non-Final Office Action Issued in U.S. Appl. No. 14/256,709", dated Jan. 9, 2015, 9 Pages.
"Notice of Allowance Issued in U.S. Appl. No. 14/256,709", dated Feb. 10, 2016, 12 Pages.
"Non-Final Office Action Issued in U.S. Appl. No. 15/156,676", dated Nov. 18, 2016, 10 Pages.
"Notice of Allowance Issued in U.S. Appl. No. 15/156,676", dated May 1, 2017, 7 Pages.
"Notice of Allowance Issued in U.S. Appl. No. 15/156,676", dated Jun. 28, 2017, 2 Pages.
Chang, "Synthesis of Band-Limited Orthogonal Signals for Multichannel Data Transmission", The Bell System Technical Journal, Aug. 4, 1966.
CA Office Action for Application No. 2,672,103, dated Nov. 6, 2014.
MX Office Action for Application No. MX/a/2009/006317, dated Mar. 9, 2011, Communicated to US Counsel dated Apr. 4, 2011.
MY Substantive Examination Adverse Report for Application No. PI 20092035, dated May 29, 2015.
Sari, "Orthogonal Frequency-Division Multiple Access and its Application to CATV Networks", European Transactions on Telecommunications, Nov. 1998.
CN Decision on Reexamination for Application No. 200880125896. 9, dated Sep. 29, 2015.
Written Opinion from International application No. PCT/US2007/011642, Search dated Sep. 28, 2007.
Written Opinion from International Application PCT/US2007/010021, search dated Oct. 17, 2007.
Youngblood, "A Sortware-Defined Radio for the Masses, Part 1," Jul./Aug. 2002, pp. 1-9.
Goeckel, "Coded Modulation With Non-Standard Signal Sets for Wireless Based OFDM", IEEE, pp. 791-795, 1999.
Bletsas et al., "Efficient Collaborative (Viral) Communication in OFDM Based WLANs", Media laboratory, MIT, {aggelos,lip}@media.miy.edu, 2003.
Goekel et al., "On the Design or Multidimentional Signal Sets for OFDM Systems", IEEE, vol. 50 No. 3, pp. 442-452, Mar. 2002.
Sereni et al., "A Software Radio OFDM Transceiver for WLAN Applications", Electronic and Information Engineering Department (DIEI)—University of Perugia—Italy, pp. 1-14, Apr. 2001.
EPO Application 08747424.3; Extended European Search Report; dated Aug. 22, 2012.
Rhee, W., "Increase in Capacity of Multiuser OFDM System Using Dynamic Subchannel Allocation", VTC 2000—Spring; 2000 IEEE 51st Vehicular Technology Conference Proceedings; Tokyo Japan, May 15-18, 2000, [IEEE Vehicular Technology Conference, New York, NY: IEEE, US, vol. CONF. 51, May 15, 2000 (May 15, 2000), pp. 1085-1089, XP000968037; DOI: 10.1109/VETECS.2000. 851292; ISBN: 978-0-7803-5719-8.
CN Notice on the Second Office Action for Application No. 200780016912.6, dated Jan. 7, 2013.
CN Notice on the Second Office Action for Application No. 200780045500.5, dated Nov. 9, 2012.
CN Notice on the First Office Action for Application No. 200780016912. 6, dated Mar. 31, 2012.
CN Notice on the First Office Action for Application No. 200880015382. 8, dated Jun. 5, 2012.
JP Notice of Reason Ior Rejection for Application No. 2009-507775, dated Mar. 21, 2012.
JP Notice of Reason for Rejection for Application No. 2009-509894, dated Mar. 21, 2012.
CN Notice on the Second Office Action for Application No. 200880015382.8, dated Feb. 8, 2013.
CN Decision on Rejection for Application No. 200780045500.5, dated Feb. 5, 2013.
CN Notice on the Second Office Action for Application No. 200880125896.9, dated Dec. 19, 2012.
EP Communication for Application No. 07777062.6-1854/2018718 PCT/US2007011642, Reference FB20744, dated Mar. 8, 2013.
EP Communication for Application No. 08747424.3-1505, Reference FB22296, dated Apr. 10, 2013.
JP Notification of Reason for Rejection for Application No. 2010-544299, dated Apr. 18, 2013.
TW Search Report for Application No. 096114706, dated Mar. 14, 2013.
KR Notice of Preliminary Rejection and Reasons for Rejection for Application No. 10-2008-7025732, Reference No. 316361.13, dated Jun. 30, 2013.
CN Decision on Rejection for Application No. 200880125896.9, Summary of the Final Rejection included, dated Jul. 29, 2013.
JP Notification of Reason for Rejection for Application No. 2010-544299, Drafting dated Jul. 29, 2013.
JP Office Action for Application No. 2009-541463, dated Jul. 19, 2013.
CN Notice on the Third Office Action for Application No. 200880015382.8, Summary of the Third Office Action included, dated Aug. 22, 2013.
EP Summons to attend oral proceeding for Application No. 08747424. 3-1505/2143222, Reference FB22296, Sep. 9, 2013.
Brodersen,et al., "Corvus: a cognative radio approach for usage of virtual unlicensed spectrum." Online: http://www.tkn.tu-berlin.de/publications/papers/CR_White_paper_final_.pdf, 2004.
Cabric, et al., "A Cognative Radio Approach for Usage of Virtual Unlicensed Spectrum," In Proc. of 14th IST Mobile Wireless Communications Summit 2005, Dresden, Germany, Jun. 2005, 4 pages unnumbered.
Chiani, et al., "Ultra Wide Bandwidth Communications towards Cognitive Radio," EMC Europe Workshop, Rome, Italy. 2005. pp. 114-117.

(56) References Cited

OTHER PUBLICATIONS

International Search Report from International Application No. PCT/US2007/010020, Search dated Nov. 5, 2007.
International Search Report from International Application No. PCT/US2007/085556, Search dated Mar. 26, 2008.
International Search Report from International Application No. PCT/US2007/011642, Search dated Sep. 28, 2007.
International Search Report from International Application No. PCT/US2007/010021, Search dated Oct. 17, 2007.
"About SDR Technology," http://www.sdrforum.org/pages/aboutSdrTech/aboutSdrTech.asp, 1 pg. 2007.
"Orthogonal Frequency Division Multiple Access," Wikipedia Online Encyclopedia; retrieved from http://en.wikipedia.org/wiki/ofdma, published Nov. 25, 2006, downloaded on Dec. 12, 2006, pp. 1-3.
"Software Defined radio," http://www.wipro.com/webpages/insights/softwareradio.htm, 1 page, 2007.
"Software Defined Radio", http:///www.altera.com/end-markets/wireless/software/sdr/wir-sdr.html, 4 pages, 2007.
Atarashi, H., "Broadband packet wireless access appropriate for high-speed and high-capacity throughput," Vehicular Technology Conference, 2001, pp. 556-570, vol. 1, Issue 2001.
Baumgarter, et al., "Performance of Forward Error Correction for IEEE 802.16," 10th International OFDM Workshop, Hamburg, Germany, Aug. 2005.
Johnsson, "HiperLAN/2—The Broadband Radio Transmission Technology Operating in the 5 GHz Frequency Band," HiperLan/2 Global Forum, 1999, Version 1.0.
Krenik, et al., "Cognitive Radio Techniques for Wide Area Networks," Annual ACM IEEE Design Automation Conference, Proceedings of the 42nd Annual Conference on Design Automation, 2005, pp. 409-412, San Diego, USA, ISBN: 1-59593-058-2.
Lawrey, et al., "Adaptive Frequency Hopping for Multiuser OFDM," Second International Conference on Information, Communications & Signal Processing, ICICS '99, Singapore, Dec. 7-10, 1999.
CN Notice on Reexamination for Application No. 200780045500.5, dated May 4, 2015.
EP Communication for Application No. 08 871 573.5-1851, Reference FB23204, dated Nov. 12, 2015.
IN First Examination Report for Application No. 5118/CHENP/2008, dated Oct. 16, 2015.
CN Notice on Reexamination for Application No. 200780045500.5, dated Dec. 26, 2014.
CA Office Action for Application No. 2,646,967, dated Jul. 11, 2014.
CN Notice on the Fourth Office Action for Application No. 200880015382.8, dated Mar. 14, 2014.
KR Notice of Preliminary Rejection for Application No. 10-2009-7014172, dated Nov. 25, 2013.
Zhang, "Adaptive OFDM System Design for Cognitive Radio," In: 11th International OFDM—Workshop, Aug. 30-31, 2006, Hamburg, Germany, pp. 91-95, IEEE Communications Society.
EP Communication for Application No. 07854775.9-1860 /2127144 PCT/US2007085556, Reference EP65237TE900kap, dated May 12, 2014.
Kivanc, "Subcarrier Allocation and Power Control for OFDMA", Conference Record of the Thirty-Fourth Asilomar Conference on Signals, Systems and Computers, Oct. 29-Nov. 1, 2000.
EP Communication for Application No. 08871573.5-1851 /2232804 PCT/US2008087860, Reference FB23204, dated Jun. 18, 2014.
Akyildiz, "NeXt generation/dynamic spectrum access/cognitive radio wireless networks: A survey", Computer Networks, Elsevier Science Publishers, May 17, 2006.
Fujii, "Multicarrier Assignment with Random pulse for Multicarrier High Speed Decentralized Wireless LAN", The 8th IEEE International Symposium on Personal, Indoor and Mobile Radio Communications, 1997, Waves of the Year 2000, (PIMRC '97), Sep. 1-4, 1997.
EP Communication for Application No. 07794366.0-1860 / 2011296 PCT/US200701 0020, Reference FB20700, dated Apr. 8, 2014.

Kivanc, "Computationally Efficient Bandwidth Allocation and Power Control for OFDMA", IEEE Transactions on Wireless Communications, vol. 2, No. 6, Nov. 2003.
Yin, "An Efficient Multiuser Loading Algorithm for OFDM-based Broadband Wireless Systems", Proceedings of the Global Telecommunications Conference, Nov. 27-Dec. 1, 2000.
Alonistioti, "End-to-End Reconfigurability", An Integrated Project in European Union's 6th Framework Program, Aug. 17, 2005.
AU Examiner's First Report on Patent Application No. 2007243348, Reference 30652319/DBW, dated May 24, 2010.
AU Examiner's First Report on Patent Application No. 2007333404, Reference 30781604/DBW, dated Aug. 18, 2010.
Bard, "Joint Tactical Radio System", Space Coast Communication Systems, Inc., Sep. 9, 2003.
Bourse, "End-to-end Reconfigurability (E2R). Enabling Interoperability, Management and Control of Complex Heterogeneous Systems", Oct. 25, 2005.
CN Notice on the First Office Action for Application No. 200780015172.4, dated Dec. 30, 2010.
CN Notice on the First Office Action for Application No. 200780045500.5, dated Jan. 31, 2012.
CN Notice on the First Office Action for Application No. 200880125896.9, dated Aug. 27, 2012.
JP Notice of Rejection for Application No. 2009-541463, dated Oct. 19, 2012.
PCT International Search Report and Written Opinion for Application No. PCT/US2008/087860, Reference 321714.02 WO, dated May 21, 2009.
Schiphorst, "A Bluetooth-enabled HiperLAN/2 receiver", Proceedings of the IEEE 58th Vehicular Technology Conference, Oct. 6-9, 2003.
Sgandurra, "Achieving SCA Compliance for COTS Software Defined Radio", Pentek Inc. Apr. 11, 2006.
Tejera, "Subchannel Allocation in Multiuser Multiple Input Multiple Output Systems", IEEE Transactions on Information Theory, Jul. 4, 2006.
RU Office Action for Application No. 2008142379, dated Feb. 11, 2011, Communicated to US Counsel dated Feb. 16, 2011.
KR Notice of Preliminary Rejection for Application No. 10-2008-7027267, dated Jul. 30, 2013.
MX Office Action for Application No. MX/a/2008/014240, dated Mar. 10, 2011, Communicated to US Counsel dated May 19, 2011.
RU Office Action for Application No. 2008144587, dated Apr. 4, 2011, Communicated to US Counsel dated Apr. 7, 2011.
RU Office Action for Application No. 2008144587, dated Dec. 7, 2010, Communicated to US Counsel dated Dec. 10, 2010.
TW Search Report for Application No. 097150662, dated Dec. 20, 2013.
KR Notice of Preliminary Rejection for Application No. 10-2014-7000529, dated Feb. 10, 2014.
EP Provision of the Minutes for Application No. 08 747 424.3-1505, Reference FB22296, dated Feb. 14, 2014.
EP Decision to Refuse for Application No. 08747424.3-1505, Reference FB22296, dated Feb. 14, 2014.
JP Secondary Office Action for Application No. 2009-541463, dated Dec. 3, 2013.
EP Summons to Attend Oral Proceedings for Application No. 08747424.3-1505 12143222, Reference FB22296, Jan. 17, 2014.
TW Search Report for Application No. 096116940, dated Sep. 8, 2010.
AU Examiner's First Report for Application No. 2007243349, Reference 306552961DBW, dated Jul. 12, 2010.
CN Notice on the Second Office Action for Application No. 200780015143.8, dated Jul. 3, 2013.
CN Decision on Reexamination for Application No. 200780015143.8, dated Mar. 28, 2013.
CN Notice on the First Office Action for Application No. 200780015143.8, dated Jan. 24, 2011.
EP Communication and Search Report for Application No. 07794367.8-1860 / 2011297 PCT/US200701 0021, Reference FB20668, dated May 12, 2014.
RU Office Action for Application No. 2008142422, dated Jan. 19, 2011, Communicated to US Counsel dated Jan. 24, 2011.

(56) References Cited

OTHER PUBLICATIONS

CA Office Action for Application No. 2,646,622, dated Jul. 21, 2014.
JP Notice of Rejection for Application No. 2009-507776, dated Mar. 25, 2010.
PCT International Search Report and Written Opinion for Application No. PCT/US2008/062321, dated Sep. 18, 2008.
Li, et al., "Clustered OFDM with Channel Estimation for High Rate Wireless Data," IEEE, Nov. 15-17, 1999, pp. 43-50.
Mitola, III, et al., "Cognitive Radio an Integrated Agent Architecture for Software Defined Radio," Royal Institute of Technology (KTH), Teleinformatics Electrum 204, SE-164 40 Kista Sweden, pp. title page through 304, May 8, 2000.
Mitola, et al., Abstract from "Cognitive Radio: Making Software Radios More Personal," Personal Communications, IEEE, Aug. 1999, vol. 6, Issue 4, pp. 13-18, Stockholm, Sweden, ISSN: 1070-9916.
Okada, et al., "Pre-DFT Combining space Diversity Assisted COFDM," IEEE Transactions on Vehicular Technology, vol. 50, No. 2, pp. 487-496, Mar. 2001.
Pottie, "Wireless Multiple Access Adaptive Communications Techniques," Online, http://www.ee.ucla.edu/-pottie/papers/encyc1.pdf, 1999.
Written Opinion from International Application No. PCT/US2007/085556, Search dated Mar. 26, 2008.
Written Opinion from International Application No. PCT/US2007/010020, Search dated Nov. 5, 2007.
Wong, et al., "Multiuser OFDM with Adaptive Subcarrier, Bit, and Power Allocation," IEEE Journal on Selected Areas in Communications, vol. 17, No. 10, Oct. 1999, pp. 1747-1758.
Wang, et al., "Complex-Field Coding for OFDM Over Fading Wireless Channels," IEEE Transactions on Information Theory, Mar. 2003, pp. 707-720, vol. 49, No. 3.
Wahlqvist, et al., "A Conceptual Study of OFDM-based Multiple Access Schemes," Telia Jun. 5, 1996. http://www.es.1th.se/home/oes/pdfs/etsi1.pdf.
Tewfik, et al., "High Bit Rate Ultra-Wideband OFDM," Global Telecommunications Conference, 2002. GLOBECOM apos;02. IEEE, Nov. 2002, pp. 2260-2264, vol. 3.
Xiaoming She, et al., "Adaptive Turbo Coded Modulation for OFDM Transmissions," Communication Technology Proceedings, 2003. ICCT 2003, Apr. 9-11, 2003, pp. 1491-1495, vol. 2, Beijing China.
Indian Patent Office, Author unknown, IN Notice of Allowance for Application No. 5117/CHENP/2008, 2 pages, dated Mar. 24, 2017, India.
Indian Patent Office, Author unknown, IN Hearing Notice in Reference of Application No. 5118/CHENP/2008, 1 page, dated May 17, 2017, India.
Norwegian Intellectual Property Office, Author Arlindo Bengui Andre, NO Search Report for Application No. 20084086, 2 Pages, dated Feb. 4, 2017, Norway.
Indian Patent Office, Author unknown, IN Second Examination Report for Application No. 5117/CHENP/2008, 2 pages, dated Dec. 19, 2016, India.
Chinese State Intellectual Property Office, Author unknown, CN Notice on Grant of Patent Right for Invention for Application No. 200880015382.8, pp. 1-2, dated Sep. 28, 2014, China.
Chinese Patent Office, Author unknown, CN Notice on Grant of Patent Right for Invention for Application No. 200880125896.9, pp. 1-2, dated Jul. 26, 2016, China.

* cited by examiner

OFDM TRANSMISSION AND RECEPTION FOR NON-OFDM SIGNALS

RELATED APPLICATIONS

This Application is a Continuation of and claims benefit from or priority of U.S. patent application Ser. No. 15/156,676 that was filed May 17, 2016, and that is a Continuation of U.S. patent application Ser. No. 14/256,709 (U.S. Pat. No. 9,363,120) that was filed Apr. 18, 2014 (issued Jun. 7, 2016), and that is a Continuation of U.S. patent application Ser. No. 13/153,801 (U.S. Pat. No. 8,718,211), filed Jun. 6, 2011 (issued May 6, 2014), and that is a Continuation U.S. patent application Ser. No. 11/899,248 (U.S. Pat. No. 7,970,085), filed Sep. 5, 2007 (issued Jun. 28, 2011), and that claims priority from U.S. Provisional Patent Application No. 60/928,114, filed May 8, 2007, each of which is incorporated herein by reference in its entirety.

BACKGROUND

Numerous current and most emerging wireless technologies are based on Orthogonal Frequency-Division Multiplexing (OFDM) where the transmitter uses an Inverse Fast Fourier Transform (IFFT) and the receiver uses Fast Fourier Transform (FFT)—both in baseband. When implemented in a Software Defined Radio (SDR), non-OFDM based schemes require a separate software module running in parallel to OFDM based schemes when simultaneous radio transmission is desired. This can cause a performance problem and increased complexity in signaling between the operating system (OS) and the hardware (HW).

SUMMARY OF INVENTION

The present invention relates to methods and apparatuses for OFDM communication of non-OFDM radio signals. To increase the effectiveness of wireless communication, and therefore the utility of mobile devices that communicate wirelessly, wireless devices may include processors and methods to allow non-OFDM signals to be processed in software configured to process OFDM signals. In this regard, the non-OFDM radio signals are force-modulated into OFDM signals and processed along with the actual OFDM.

In one embodiment, a method of operating a computing device to accommodate non-OFDM signals is disclosed. The method includes receiving a non-OFDM signal; processing the non-OFDM signal into a created OFDM signal; and processing the created OFDM signal.

In another embodiment, a method of operating a computing device to accommodate non-OFDM signals is disclosed. The method includes receiving a non-OFDM signal; processing the non-OFDM signal into an OFDM signal to produce a created OFDM signal; receiving an actual OFDM signal; and processing the actual OFDM signal with the created OFDM signal.

In still another embodiment, an apparatus for operating a computing device to accommodate non-OFDM signals is provided. The apparatus includes a first receive circuit configurable to receive a non-OFDM signal and a first processor configurable to process the non-OFDM signal to produce a created OFDM signal. A second receive circuit is configurable to receive an OFDM signal and a second processor is configurable to process the actual OFDM signal together with the created OFDM signal and to execute an FFT on the signals.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
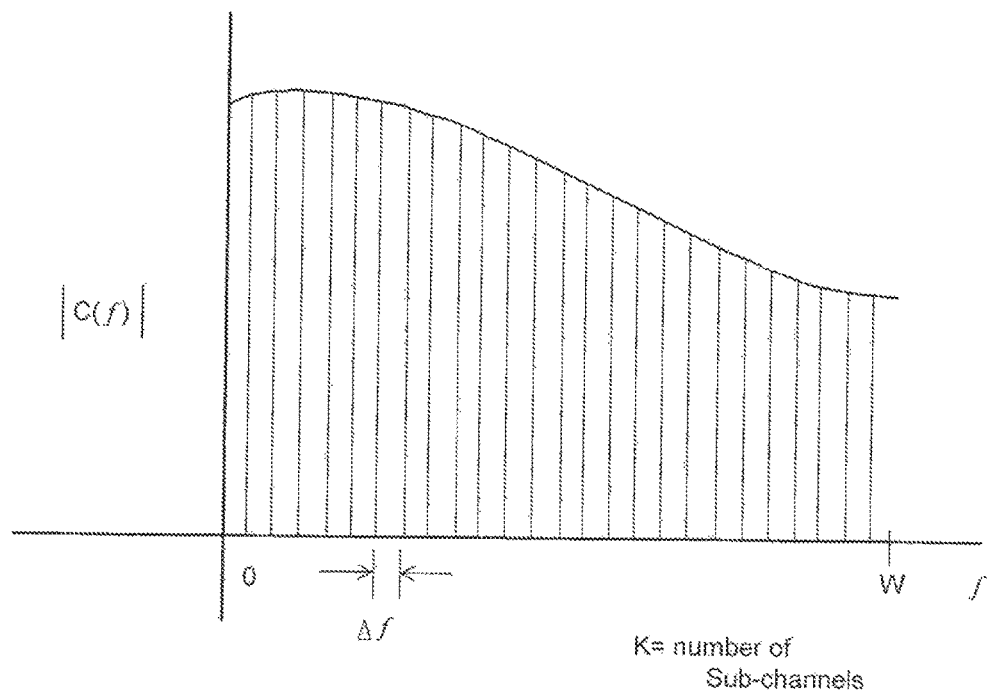
FIG. 1 is a graphical representation of a subdivision of the channel bandwidth into narrowband sub-channels of equal width.

This disclosure addresses the need in prior art systems for separate software modules running in parallel to handle both non-OFDM based schemes and OFDM based schemes when simultaneous radio transmission is desired. In one aspect, this problem is addressed by force-modulating non-OFDM signals into OFDM signals. The non-OFDM signal is received and is processed to produce a created OFDM signal. An actual OFDM signal is also received and is processed together with the created OFDM signal. In this manner, non-OFDM signals to be processed in software configured to process OFDM signals. It should be appreciated that the present invention is not limited to single access OFDM and that multiple access OFDMA may be employed.

By way of example, if a user is using a Bluetooth headset, together with browsing the Internet (e.g., on MSN) using a wireless connection, the headset is communicating wirelessly with the computer and the computer is communicating wirelessly to the Internet connection. Using Software Defined Radio (SDR), both Bluetooth modulation and the connection to the Internet can be employed. However, the Bluetooth communication employs non-OFDM transmission whereas the wireless connection to the Internet employs OFDM transmission. Accommodating for this mixed-signal is more complex with more signaling between the different radios as compared to a single-type signal between radios. The inventors have appreciated that if the non-OFDM signal (e.g., Bluetooth signal) is transformed into an OFDM or OFDM-like signal, then just one module and/or one executable file to handle the signals need be employed. Using suitable FFT and IFFT algorithms for the signals, different radios are not required.

Data is typically transmitted at high speed and is sent through a serial to parallel converter. The data is transferred from serial to a 52 parallel stream. By way of example, if data is transmitted at 52 megabit per second, each stream would be 1 megabit per second. The 52 streams are then processed via an IFFT algorithm. The signal may then be transformed from parallel to serial again and transmitted over the channel. At the receiver, the inverse operation is performed, namely the data is sent through an FFT algorithm.

Continuing with this example, at this point, the bandwidth that is available is effectively chopped into sub-channels. For example, a 20 MHz channel transmitting into 52 sub-channels, results in each channel being about 300 KHz.

According to an aspect of this invention, the SDR controller (the control channel) decides how to transmit an OFDM signal as follows. The Operating System (OS) knows that it must transmit two different wireless protocols, e.g., both WiFi and Bluetooth. That is, there is a request for transmitting in one wireless mode (e.g., WiFi) and there is another request for transmitting in another wireless mode (e.g., Bluetooth). In this case, the OS recognizes that the OFDM operation has come over 52 sub-channels and each sub-channel is equivalent to approximately 300 KHz. This information is captured by the controller of the SDR and is fed to a module that indicates transmitting the non-OFDM signal (e.g., the Bluetooth signal). The system then makes sure that the Bluetooth connection is channelized to 300 KHz. In this regard, the Bluetooth is about 1 MHz of bandwidth so data is transmitted over the Bluetooth channel and each channel is a continuous 1 MHz. With regard to the OFDM signal (e.g., the WiFi signal), the signal is transmitted over 52 sub-channels and each sub-channel is approximately 380+ KHz wide (i.e., 20 MHz divided by 52 sub-channels). In this case, the Bluetooth stream is transmitting at a certain data rate of about 1 MHz, which will require approximately 3 sub-channels. That is, the stream is split it into three sub-channels. Thus, with the OFDM signal (e.g., WiFi) being transmitted over 52 sub-channels (serial to 52 parallel streams) and the non-OFDM signal (e.g., Bluetooth) being transmitted over 3 sub-channels, a total of 55 sub-channels exist.

An IFFT of the 55 sub-channels is then performed. On the receiver side, the WiFi receiver is performing 52 sub-channel FFTs and the Bluetooth receiver is performing 3 sub-channel FFTs. In this manner, the same executable module of the SDR is employed. The same hardware is available for use and the complexity of transmitting simultaneous radio is much less in this case than transmission of Bluetooth and WiFi separately.

Thus, a signal that is otherwise non-OFDM (e.g., Bluetooth) is made to appear as though it is OFDM, which can then be processed along with the OFDM signals.

If implemented in software, the signals are software combined and is processed in the same module.

It should be appreciated that the present invention is not limited to transmitting Bluetooth and WiFi; rather the invention contemplates OFDM transmission and reception of non-OFDM signals and OFDM signals. Similarly, the sub-channels available are not limited to the example provided. Rather, the maximum number of sub-channels is limited by the processor speed.

A further example is discussed below.

In one embodiment, Wi-Fi 802.11n and Bluetooth 2.1 are embedded in a laptop using SDR. That is, there is a single RF front end that is used for both communication protocols while the baseband and MAC protocol are implemented in software.

The Wi-Fi PHY implements an OFDM modulation scheme as described in co-pending U.S. patent application Ser. No. 11/637,449, titled "Cognitive Multi-User OFDMA", filed Dec. 12, 2006 and Ser. No. 11/635,869, titled "System Capability Discovery for Software Defined Radio", filed Dec. 8, 2006, each of which is assigned to the assignee of the present application and each of which is hereby incorporated herein by reference in its entirety. The Bluetooth device implements a form of GFSK modulation. But the Bluetooth can still be communicated in an OFDM based framework.

In OFDM the available channel bandwidth W is subdivided into a number of equal-bandwidths called sub-channels, where the bandwidth of each sub-channel is sufficiently narrow so that the frequency response characteristics of the sub-channels are nearly ideal. Such a subdivision of the overall bandwidth into smaller sub-channels is illustrated in FIG. 1. Thus, K=W/Δf sub-channels is created, where different information symbols can be transmitted simultaneously in the K sub-channels. With each sub-channel, a carrier is associated as follows:

$$x_k(t)=\sin 2\pi f_k t,\ k=0,1,\ldots,K-1 \quad [1]$$

where $f_k$ is the mid-frequency in the kth sub-channel.

By selecting the symbol rate 1/T on each of the sub-channels to be equal to the separation Δf of adjacent sub-carriers, the subcarriers are orthogonal over the symbol interval T, independent of the relative phase relationship between sub carriers; i.e., $$\int_0^T \sin(2\pi f_k t + \phi_k)\sin(2\pi f_j t + \phi_j)dt = 0 \quad [2]$$

where $f_k-f_j=n/T$, n=1, 2, ..., independent of the values of the phases $\phi_k$ and $\phi_j$.

With an OFDM system having K sub-channels, the symbol rate on each sub carrier is reduced by a factor of N relative to the symbol rate on a single carrier system that employs the entire bandwidth W and transmits data at the same rate as OFDM. Hence, the symbol interval in the OFDM system is $T=KT_s$, where $T_s$ is the symbol interval in the single-carrier system.

Figure 2:
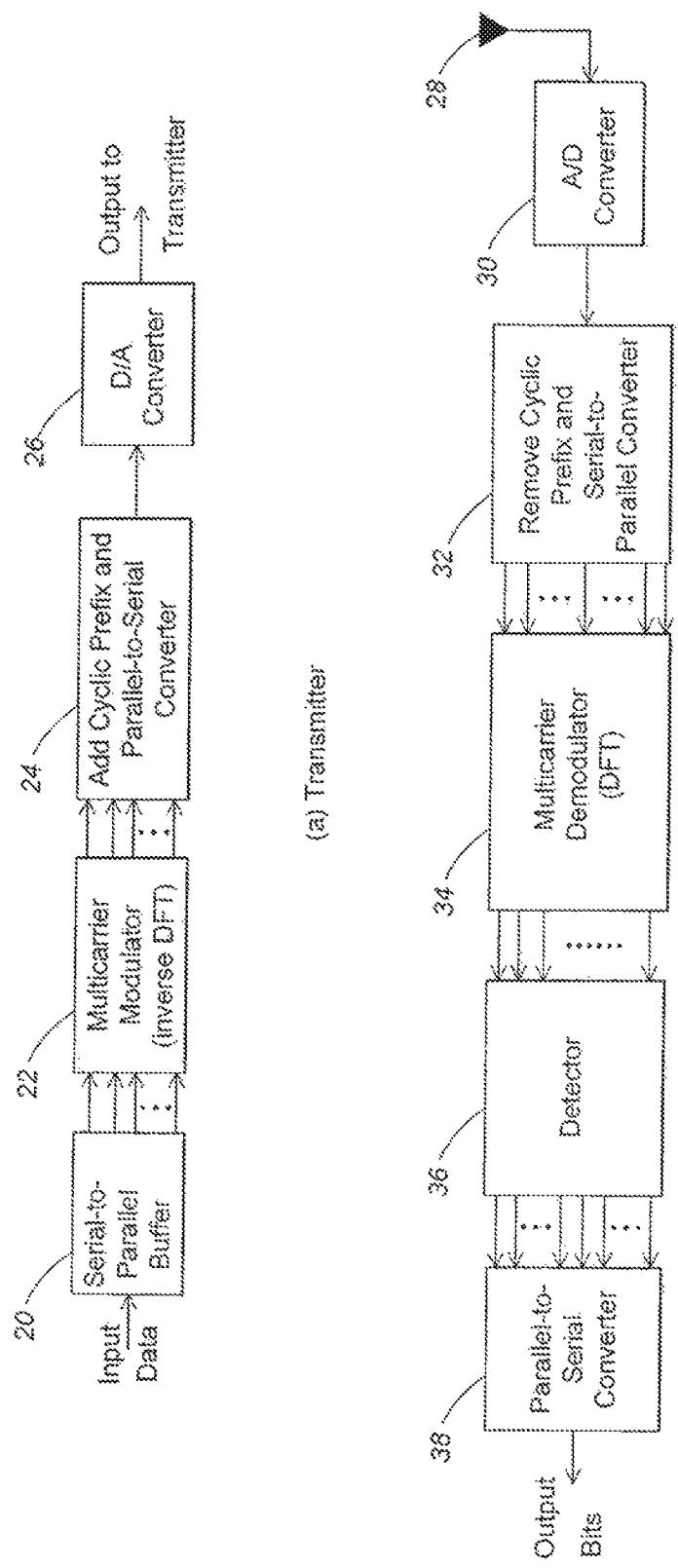
FIG. 2 is a block diagram of a multi carrier OFDM digital communication system.

It should be appreciated that the present invention is not limited to dividing the channel into a sub-channels of a certain width. Instead, the channel may be divided into sub-channels of narrower width than that described here. In this manner, the non-OFDM signal may determine how finely to divide the channels into appropriately sized sub-channels The modulator and demodulator in an OFDM system are efficiently implemented by use of the FFT algorithm to compute the DFT/IDFT. The basic block diagram of the OFDM is illustrated in FIG. 2. At block 20, a serial-to-parallel buffer subdivides the information sequence into frames of $B_f$ bits. The $B_f$ bits in each frame are parsed into K groups, where the i th group is assigned $b_i$ bits. Hence, $$\sum_{i=1}^{K} b_i = B_f \quad [3]$$

A multi-carrier modulator, as illustrated at block 22, may be viewed as generating K independent QAM sub-channels, where the symbol rate for each sub-channel is 1/T and the signal in each sub-channel has a distinct QAM constellation. Hence, the number of signal points for the i-th sub-channel is $M_i=2^{b_i}$. At block 24 a cyclic prefix is added to reduce the effect of intersymbol interference from neighboring symbols. Then the parallel sequence is multiplexed back into a serial stream of bits, and inputted to a digital to analog converter (D/A) at block 26 that renders the digital symbols into analogue before up converting to the RF frequency of interest and radiating with an antenna.

The receive side is the reciprocal of transmission. The receive RF signal is intercepted by an antenna shown at 28, down converted in frequency before it is digitized by an analogue to digital converter (A/D) at block 30, multiplex from a serial stream to a parallel stream. At block 32 the prefix added in transmission is removed. An FFT is preformed, at block 34, on the parallel sequence. This followed by a detector at block 36, to decide on the bits, which is then input to a parallel to serial multiplexer, at block 38.

The complex-valued signal points corresponding the information signals on the K sub-channels may be denoted by $X_k$, k=0, 1, . . . , K−1. These information symbols $\{X_k\}$ represent the values of the discrete Fourier transform (DFT) of a multi-carrier OFDM signal x(t), where the modulation on each subcarrier is QAM. Since x(t) must be a real-valued signal, its N-point DFT $\{X_k\}$ must satisfy the symmetry property $X^{N-k}=X^*_k$. Therefore, we create N=2K symbols from K information symbols by defining:

$$X_{N-K}=X^*_K, k=1,2,\ldots,K-1$$

$$X'_0=Re(X_0)$$

$$X_N=Im(X_0) \quad [4]$$

Note that the information symbol $X_0$ is split into two parts, both of which are real. If the new sequence of symbols is denoted as $(X'_k, k=0, 1, \ldots, N-1)$, the N-point inverse DFT (IDFT) yields the real-valued sequence:

$$x_n = \frac{1}{\sqrt{N}} \sum_{k=0}^{N-1} X'_k \exp(j2\pi nk/N) \quad n=0, 1, \ldots, N-1 \quad [5]$$

where $1/\sqrt{N}$ is simply a scale factor.

This sequence $\{x_n, 0 \le n \le N-1\}$ corresponds to samples of the multicarrier OFDM signal x(t), consisting of K subcarriers.

Continuing with this example, at this point, the OFDM has as an input $\{X_n, 0 \le n \le N-1\}$ and an output $\{x_n, 0 \le n \le N-1\}$.

Regarding the Bluetooth modulation, the GFSK signal, which is the typical modulation protocol employed with Bluetooth, can be represented by $$s(t,\alpha)=A\cos(2\pi f_c t+\phi(t,\alpha)), \quad [6]$$

where $$A=\sqrt{\frac{2E_b}{T}}$$

$E_b$ is the energy per data bit;
$f_c$ is the carrier frequency;
α is the random input stream having data bits $\alpha_i$;
φ(t,α) is the output phase deviation, given by $$\phi(t,\alpha) = 2\pi h_f \int_{-\infty}^{t} \sum_{i=-\infty}^{n} \alpha_i g(\tau-iT) d\tau. \quad [7]$$

In GFSK, a single bit is transmitted over multiple symbols. This may be accomplished by using a pulse shaping filter with impulse response g(t) given by $$g(t) = \frac{1}{2T}\left[Q\left(2\pi B_b \frac{t-\frac{T}{2}}{\sqrt{\ln 2}}\right) - Q\left(2\pi B_b \frac{t+\frac{T}{2}}{\sqrt{\ln 2}}\right)\right], \quad [8]$$

where Q(t) standard Q-function $$Q(t) = \int_t^\infty \frac{1}{\sqrt{2\pi}} e^{-\frac{\tau^2}{2}} d\tau.$$

By introducing controlled intersymbol interference, the spectral occupancy of the signal is substantially reduced.

Rewriting the above equation [7], then $$\phi(t,\alpha) = 2\pi h_f \sum_{i=n-L+1}^{n} \alpha_i q(t-iT) + \pi h_f \sum_{i=-\infty}^{n-L} \alpha_i, \quad [9]$$

where L is the length of g(t), and $$q(t) = \int_{-\infty}^{t} g(\tau) d\tau.$$

For Bluetooth with $B_b T=0.5$, L=2, which means that a single data bit is spread over two consecutive symbol intervals.

Bluetooth uses 1 MHz channelization. If an SDR is used that includes 802.11a/g/n, the sub-channels are ~384 KHz. Therefore, three sub-channels would be sufficient to cover each Bluetooth transmission/reception. In this manner, the OFDM based cognitive radio is employed for OFDM based schemes and non-OFDM based schemes. Any loss in the non-matched filter is likely to be small.

The Bluetooth signal is multiplexed in software into three separate streams, each with ⅓rd the data rate. These streams are then input to the same OFDM modulator used to transmit the 802.11n signal.

Figure 3:
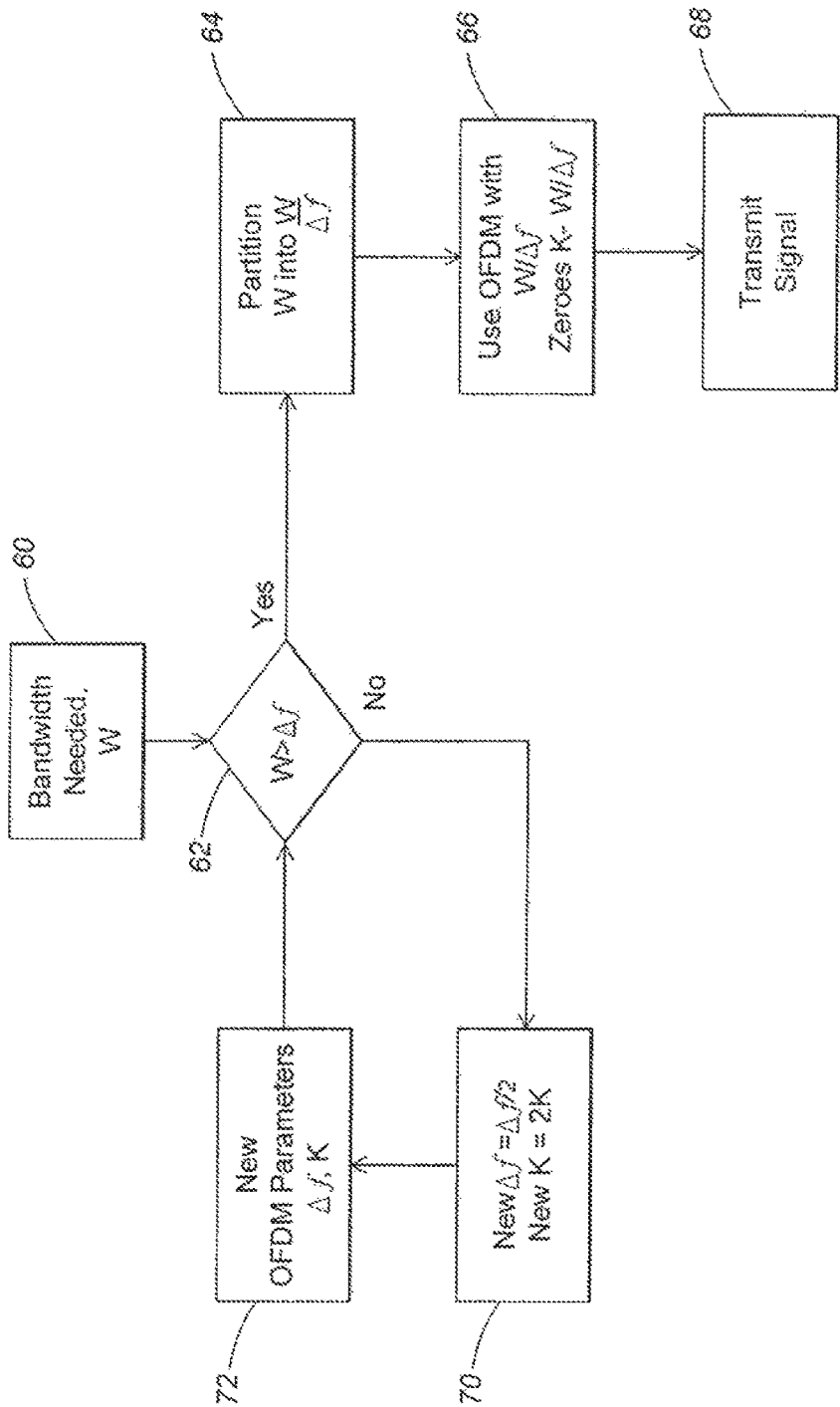
FIG. 3 is a flowchart of an illustrative process in accordance with embodiments of the invention.

FIG. 3 is an illustrative flowchart of one embodiment for transmitting data. At block 60, the bandwidth needed is represented by W. At block 62, a decision is made whether the bandwidth needed, W, is greater than the bandwidth of a sub-channel Δf. If W>Δf, then the process proceeds to block 64, where the bandwidth is partitioned into K sub-channels, where K=W/Δf. At block 66, OFDM processing is performed with K number of sub-channels. At block 68, the signal is transmitted.

If the bandwidth W is not divided evenly and extra bandwidth remains that cannot take up an entire sub-channel, then, in one embodiment, the remaining bandwidth can be assumed to be a power loss. In another embodiment, the bandwidth can be divided so that the sub-channels exceed the bandwidth. In this case, the extra sub-channel can be considered noise. In yet another embodiment, as described in block 70, the sub-channel can be divided into further sub-channels such that a new Δf is provided. In this manner, on the one hand, power loss is limited and on the other hand noise is limited. In the example shown, the sub-channels are divided in half, however, it should be appreciated that the sub-channels can be divided into thirds, fourths, fifths, sixths or any other divisor, as the present invention is not limited in this respect. The process then continues at block 72 with the new parameters. Without being limited to theory, as a general rule, if either a power loss or noise (that is, the remaining bandwidth) is limited to less than about 5% to 10%, then dividing the sub-channels into further sub-channels may not be necessary.

Referring again to block 66, the signals may be processed using, for example, an FFT. In one embodiment, the FFT is programmed to process each of the sub-channels for the OFDM signals. This same FFT is used to process the non-OFDM signals, however because the FFT is programmed to process the larger number of total sub-channels for the OFDM signals, when it is time to process the non-OFDM signals, some of the sub-channels are zeroed out. For example, suppose the FFT is programmed to process 52 sub-channels for the OFDM signal, then this same FFT will attempt to process 52 sub-channels for the non-OFDM signals but there may only be 3 sub-channels having signal data. Accordingly, in one embodiment, the remaining 49 sub-channels are set to zero.

In another embodiment, the FFT can be programmed to process three sub-channels, rather than the 52 sub-channels. In this example, the non-OFDM signals are efficiently processed and no zeroing occurs, but then each set of three remaining sub-channels for the OFDM signals will be processed separately, thereby requiring many more routines of the FFT.

Figure 4:
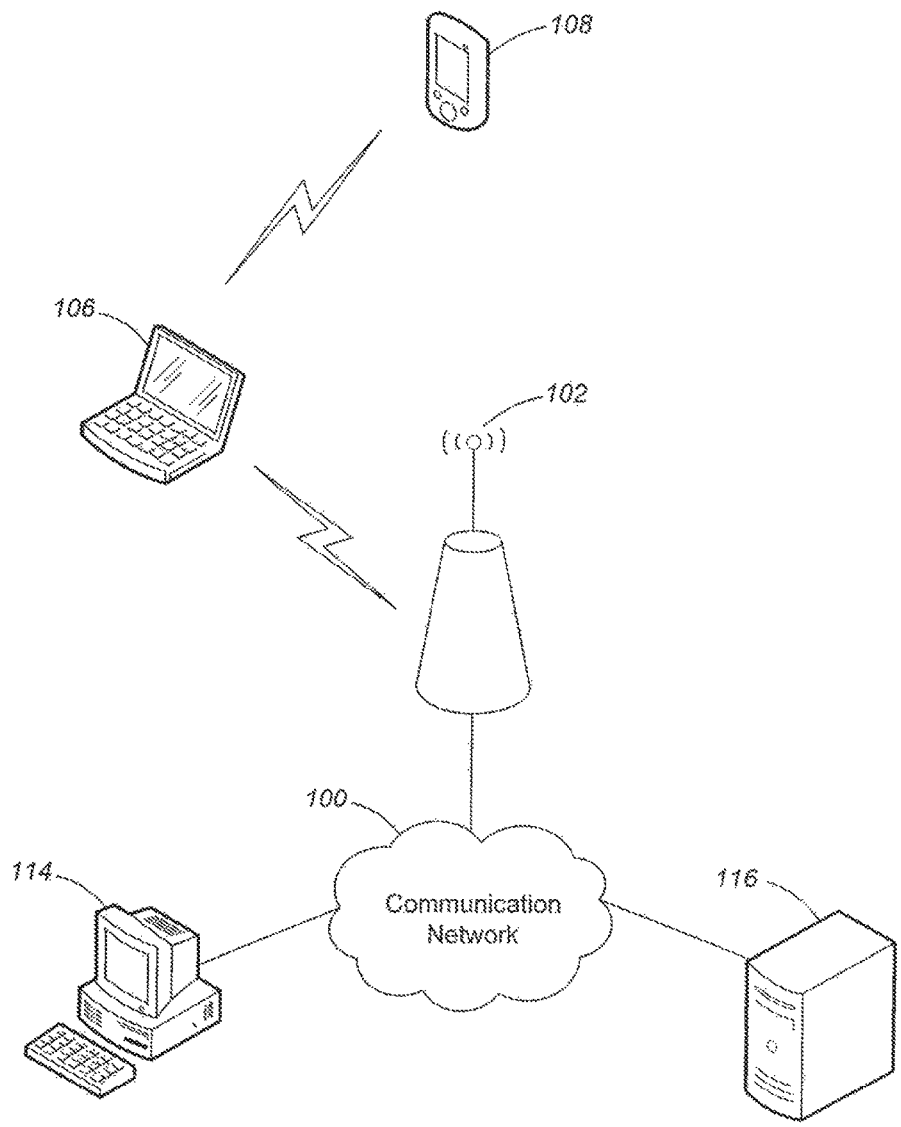
FIG. 4 is a diagram of an illustrative computer system environment in which embodiments of the invention may be implemented.

The aspects of the present invention described herein can be implemented on any of numerous computer system configurations and are not limited to any particular type of configuration. FIG. 4 illustrates one example of a computer system on which aspects of the invention can be implemented, although others are possible.

The computer system of FIG. 4 includes communication network 100, wireless access point 102, one or more wireless computing devices 106 configured to transmit and receive OFDM signals with the wireless access point 102, one or more wireless devices 108 configured to transmit and receive non-OFDM signals with the one or more wireless computing devices 106, and wired computing devices 114 and 116. Communication network 100 can be any suitable communication medium or media for exchanging data between two or more computers (e.g., a server and a client), including the Internet. The wireless client devices can be any suitable computing device with wireless communication capabilities. Several exemplary mobile computing devices can be employed, including a laptop, a personal digital assistant, and a smart phone. While FIG. 4 includes communication network 100 with wired devices 114 and 116, embodiments of the invention can be used in systems that do not include a wired network.

Figure 5:
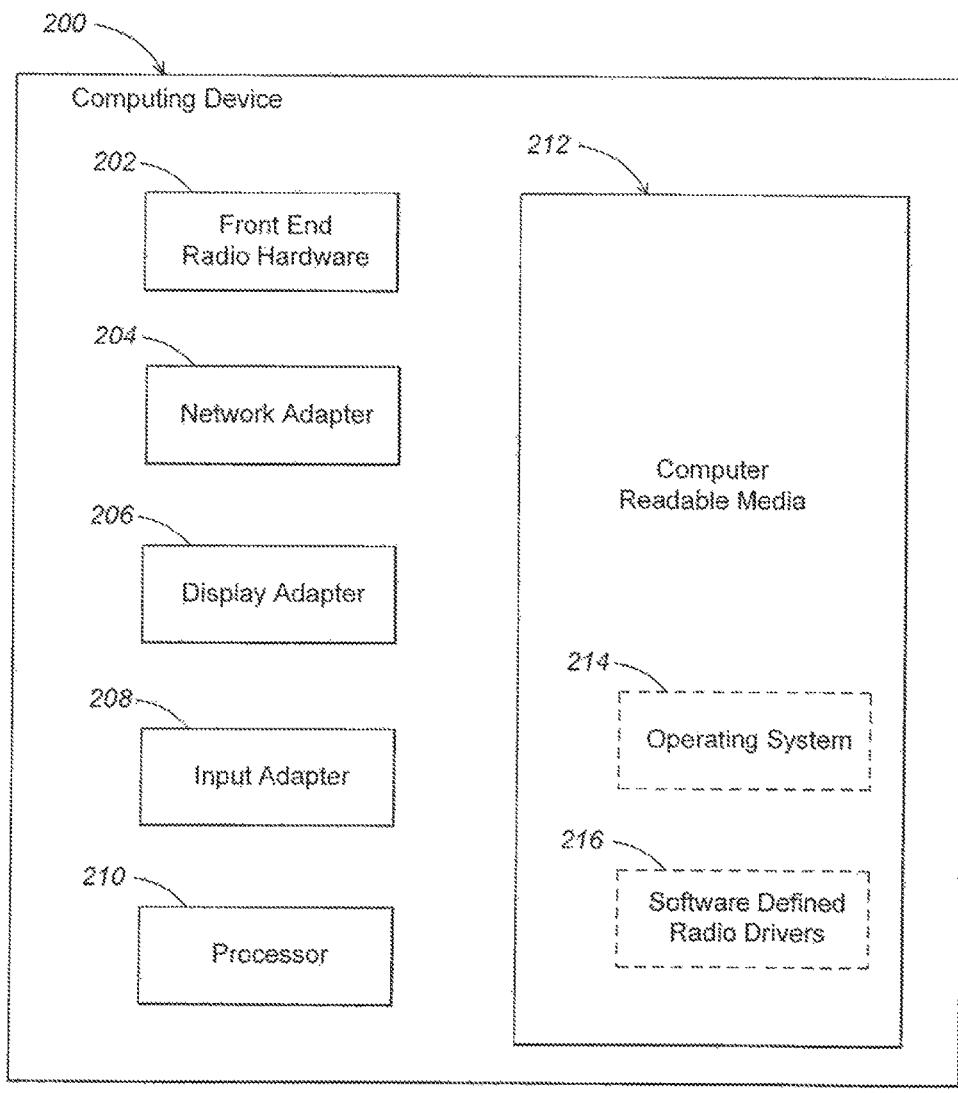
FIG. 5 is an exemplary computing device that may be used in accordance with embodiments of the invention.

FIG. 5 schematically shows an illustrative computing device 200 that may be used in accordance with one or more embodiments of the invention. FIG. 5 is intended to be neither a depiction of necessary components for a computing device to operate with embodiments of the invention nor a comprehensive depiction. Computing device 200 comprises front end radio hardware 202 to communicate wirelessly, e.g., with wireless access point 102 or with other devices 108. Device 200 also comprises a network adapter 204 to communicate over a computer network using other (possibly non-wireless) methods, a display adapter 206 to display information to a user of the device, and an input adapter 208 to receive commands from the user. Device 200 further comprises computer-readable media 212 for storing data to be processed and/or instructions to be executed by a processor 210. Processor 210 enables processing of data and execution of instructions. The data and the instructions may be stored on the computer-readable media 212 and may, for example, enable communication between components of the computing device 200. The data and instructions may comprise an operating system 214 and software defined radio drivers 216. SDR drivers 216 may comprise data and instructions to carry out many functions typically done in hardware-implemented radios. The functions performed by drivers 216 may complement the functions of front end radio hardware 202, such that all desired functions may be performed by the combination of hardware and software.

Front end radio hardware 202 may be any suitable radio hardware performing any combination of functions. These functions may include modulation (i.e., mixing a data signal into a high frequency transmission signal), filtering (i.e., parsing data out of a received signal), analog-to-digital or digital-to-analog conversion, signal generation (i.e., transmitting the data), etc. Front end 202 may be implemented to perform a minimum of the required functions that need to be performed at the hardware level, with the remaining functions being implemented by SDR drivers 216. The present function is not limited to use with systems that decide the responsibilities of the hardware and software in any particular way. Front end 202 may comprise an antenna, a programmable radio-frequency waveform generator/decoder that spans a wide radio spectrum, an array of fast analog to digital converters, and/or serializers/de-serializers to convert analog data into computer-processable bytes and vice versa. A set of tunable analog filters may also be employed to comply with mandated spectrum masks. These hardware components are merely illustrative, as invention not limited to use on systems having any particular hardware.

SDR drivers 216, in addition to performing radio functions, may transmit control instructions to the tunable circuitry of front end 202 to customize the hardware of the front end 202 according to a particular wireless protocol.

It should be appreciated that one embodiment of the invention is directed to use with a computing device having programmable circuitry (e.g., the front end hardware 202 and the SDR drivers 216) that is programmable by control instructions to generate and/or receive signals according to a wireless protocol, including, for example, the process described herein with regard to handling both OFDM and non-OFDM signals. Again, this programmable circuitry can take any suitable form and include any collection of directly programmable circuitry (e.g., a programmable processor) and circuitry that interacts with directly programmable circuitry to enable communication according to a wireless protocol.

It should be appreciated that the embodiments of the present invention described herein are not limited to being practiced with the type of computing device illustrated in FIG. 5, and that embodiments of the invention can be practiced with any suitable computing device. The front end 202 and adapters 204-208 may be implemented as any suitable hardware, software, or combination thereof, and may be implemented as a single unit or multiple units. Similarly, computer-readable media 212 may be implemented as any medium or combination of media for storing data and instructions for access by a processing device.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method performed on a computing device that includes radio hardware, the method comprising:
dividing, by the computing device, a channel into a plurality of subchannels;
converting, by the computing device, first data from serial to a first plurality of parallel streams of the first data, where the first data comprises an OFDM (Orthogonal Frequency-Division Multiplexing) signal;

converting, by the computing device, second data from serial to a second plurality of parallel streams of the second data, where the second data comprises a non-OFDM signal;

selecting a first distinct subset of the plurality of subchannels into which the first plurality of parallel streams of the first data is split;

selecting a second distinct subset of the plurality of subchannels into which the second plurality of parallel streams of the second data is split;

modulating, by the computing device, the first plurality of parallel streams of the first data and the second plurality of parallel streams of the second data onto the plurality of subchannels of the channel, where the modulated first plurality of parallel streams of the first data is split into the selected first distinct subset of the plurality of subchannels, and where the modulated second plurality of parallel streams of the second data is split into the selected second distinct subset of the plurality of subchannels; and transmitting, by the radio hardware over the channel, a radio signal comprising the modulated first plurality of parallel streams of the first data and the modulated second plurality of parallel streams of the second data.

2. The method of claim 1 where the modulated first plurality of parallel streams of the transmitted radio signal comprises a WiFi signal as the OFDM signal and where the modulated second plurality of parallel streams of the transmitted radio signal comprises a Bluetooth signal as the non-OFDM signal.

3. The method of claim 1 where the channel comprises fifty-five subchannels.

4. The method of claim 1 where the first distinct subset of the plurality of subchannels contains fifty-two of the plurality of subchannels.

5. The method of claim 1 where the second distinct subset of the plurality of subchannels contains three of the plurality of subchannels.

6. The method of claim 1 where the modulated first plurality of parallel streams of the transmitted radio signal comprises an Orthogonal Frequency-Division Multiplexing ("OFDM") signal.

7. The method of claim 1 where the modulated second plurality of parallel streams of the transmitted radio signal comprises a Bluetooth signal.

8. A computing device comprising:

at least one processor;

memory that is couple to the at least one processor and that includes computer-readable instructions that, based on execution by the at least one processor, configure the computing device to perform actions comprising:

dividing, by the computing device, a channel into a plurality of subchannels;

converting, by the computing device, first data from serial to a first plurality of parallel streams of the first data, where the first data comprises an OFDM (Orthogonal Frequency-Division Multiplexing) signal;

converting, by the computing device, second data from serial to a second plurality of parallel streams of the second data, where the second data comprises a non-OFDM signal;

selecting a first distinct subset of the plurality of subchannels into which the first plurality of parallel streams of the first data is split;

selecting a second distinct subset of the plurality of subchannels into which the second plurality of parallel streams of the second data is split;

modulating, by the computing device, the first plurality of parallel streams of the first data and the second plurality of parallel streams of the second data onto the plurality of subchannels of the channel, where the modulated first plurality of parallel streams of the first data is split into the selected first distinct subset of the plurality of subchannels, and where the modulated second plurality of parallel streams of the second data is split into the selected second distinct subset of the plurality of subchannels; and transmitting, by the radio hardware over the channel, a radio signal comprising the modulated first plurality of parallel streams of the first data and the modulated second plurality of parallel streams of the second data.

9. The computing device of claim 8 where the modulated first plurality of parallel streams of the transmitted radio signal comprises a Wifi signal as the OFDM signal and where the modulated second plurality of parallel streams of the transmitted radio signal comprises a Bluetooth signal as the non-OFDM signal.

10. The computing device of claim 8 where the channel comprises fifty-five subchannels.

11. The computing device of claim 8 where the first distinct subset of the plurality of subchannels contains fifty-two of the plurality of subchannels.

12. The computing device of claim 8 where the second distinct subset of the plurality of subchannels contains three of the plurality of subchannels.

13. The computing device of claim 8 where the modulated first plurality of parallel streams of the transmitted radio signal comprises an Orthogonal Frequency-Division Multiplexing ("OFDM") signal.

14. The computing device of claim 8 where the modulated second plurality of parallel streams of the transmitted radio signal comprises a Bluetooth signal.

15. At least one memory that comprises computer-readable instructions that, based on execution by a computing device, configure the computing device to perform actions comprising:

converting, by the computing device, first data from serial to a first plurality of parallel streams of the first data, where the first data comprises an OFDM (Orthogonal Frequency-Division Multiplexing) signal;

converting, by the computing device, second data from serial to a second plurality of parallel streams of the second data, where the second data comprises a non-OFDM signal;

selecting a first distinct subset of the plurality of subchannels into which the first plurality of parallel streams of the first data is split;

selecting a second distinct subset of the plurality of subchannels into which the second plurality of parallel streams of the second data is split;

modulating, by the computing device, the first plurality of parallel streams of the first data and the second plurality of parallel streams of the second data onto the plurality of subchannels of the channel, where the modulated first plurality of parallel streams of the first data is split into the selected first distinct subset of the plurality of subchannels, and where the second plurality of parallel streams of the second data is split into the selected second distinct subset of the plurality of subchannels; and transmitting, by the radio hardware over the channel, a radio signal comprising the modulated first plurality of parallel streams of the first data and the modulated second plurality of parallel streams of the second data.

16. The at least one memory of claim 15 where the channel comprises fifty-five subchannels.

17. The at least one memory of claim 15 where the first distinct subset of the plurality of subchannels contains fifty-two of the plurality of subchannels.

18. The at least one memory of claim 15 where the second distinct subset of the plurality of subchannels contains three of the plurality of subchannels.

19. The at least one memory of claim 15 where the modulated first plurality of parallel streams of the transmitted radio signal comprises a WiFi signal as the OFDM signal.

20. The at least one memory of claim 15 where the modulated second plurality of parallel streams of the transmitted radio signal comprises a Bluetooth signal as the non-OFDM signal.

* * * * *